United States Patent [19]

Ditmanson

[11] 4,319,615

[45] Mar. 16, 1982

[54] ROUTER ATTACHMENT FOR ORNAMENTING A WORKPIECE

[75] Inventor: Henry A. Ditmanson, Medford, Oreg.

[73] Assignees: Robert C. Ditmanson; Richard A. Ditmanson, both of Sacramento, Calif.; Helen Donaldson, Medford, Oreg.

[21] Appl. No.: 218,708

[22] Filed: Dec. 22, 1980

[51] Int. Cl.³ .............................................. B27C 5/10
[52] U.S. Cl. ........................... 144/144 R; 51/100 R; 51/127; 144/134 D; 409/79; 409/124
[58] Field of Search .......... 144/134 R, 134 D, 136 R, 144/137, 144 R, 139, 323, 136 C; 33/26, 27 R, 27 G, 27 L; 51/127, 100 R; 409/118, 123, 124, 175, 79, 178, 182

[56] References Cited

U.S. PATENT DOCUMENTS

| 2,307,464 | 1/1943 | Meting ........................ 144/144 R X |
| 2,664,122 | 12/1953 | Allen, Sr. ........................ 144/144 R |
| 3,133,464 | 5/1964 | Bell .................................. 409/79 X |
| 3,472,122 | 10/1969 | Vertin ............................. 409/118 X |
| 3,841,368 | 10/1974 | Ritter ........................... 144/144 R X |
| 3,910,159 | 10/1975 | Gladwin ......................... 51/127 X |
| 3,957,095 | 5/1976 | Johnson ......................... 144/137 X |
| 4,248,282 | 2/1981 | Waldmon et al. ............. 409/124 X |

FOREIGN PATENT DOCUMENTS 316866 12/1956 Switzerland .................... 144/134 D Primary Examiner—W. D. Bray
Attorney, Agent, or Firm—Lothrop & West

[57] ABSTRACT

Undulatory rails on a track can be oriented in any given direction by placing the track on a turntable. A wheeled carriage rides to or fro on the track and carries a router. The router bit rises and falls in response to the particular profile of the rails and cuts recesses in an underlying workpiece having shapes dependent on rail contour, bit size and shape and extent of carriage travel. Turntable indexing capabilities facilitate the reproducibility of complex decorative patterns sculptured in the workpiece.

2 Claims, 4 Drawing Figures

ROUTER ATTACHMENT FOR ORNAMENTING A WORKPIECE

BACKGROUND OF THE INVENTION

1. Field of the Invention

The invention relates generally to tools for ornamenting, or decorating, a workpiece, such as a piece of wood; and, more particularly, to a device which cooperates with a conventional router to carve decorative patterns in the surface of a workpiece in a quick, accurate and reproducible manner, with but a minimum of effort.

2. Description of the Prior Art

Jentsch U.S. Pat. No. 3,442,309 and Ritter U.S. Pat. No. 3,841,368 disclose router attachments which guide the router bit in a horizontal plane to provide patterns having numerous different configurations in plan but which are uniform in depth. That is to say, the patterns are characterized by recesses having only two degrees of freedom of motion.

Metting U.S. Pat. No. 2,307,464 provides an attachment for a circular saw including a series of vertically contoured templates which cause the sawblade to rise and fall in response to the contours. This tool, however, cuts only in a series of parallel passes with the remaining ridges of material subsequently cut away by means of a chisel, gouge or other suitable tool, to provide a replica of a curved surface used as a pattern for a stamping die. Metting's tool is highly specialized, is limited to repetitive parallel cuts by a circular saw, and the work piece eventually ends up as a smoothly undulating pattern for use in molding a die.

Johnson U.S. Pat. No. 3,957,095 discloses a hand plane with an arcuate blade which is alternately lifted and lowered by an eccentric rolling assembly connected to the front end of the plane. The blade gouges chips from a lumber workpiece, giving it a hand hewn effect. In contradistinction to applicant's device, which makes carefully structured patterns, Johnson's attachment has as its sole purpose the creation of random gouges simulating the effect obtained by using an adze.

In summary, the prior art lacks the three-dimensional capabilities of applicant's device which enables the user to create a multitude of carefully sculptured decorative ornamentations on a work piece with a router having three degrees of freedom of motion.

SUMMARY OF THE INVENTION

A turntable is rotatably mounted on a base plate located above a workpiece being decorated by a variety of patterns cut into the workpiece by a router. The router, in turn, is mounted on a carriage which rolls to and fro on a pair of rails removably secured to the turntable. Two degrees of freedom of motion are thereby provided.

The tops of the rails are contoured in a variety of undulations so that as the router moves along the rails, the router bit rises and falls and cuts into the work piece lightly or deeply to form recesses of many unique shapes in dependence upon the particular contour, the vertical movement affording a third degree of freedom of motion to the router.

While the router attachment of the invention is susceptible of numerous different embodiments, depending upon the environment and requirements of use, a prototype of the herein shown and described embodiment has been made, tested and used, and has performed in an entirely satisfactory manner.

DESCRIPTION OF THE PREFERRED EMBODIMENTS

Figure 1:
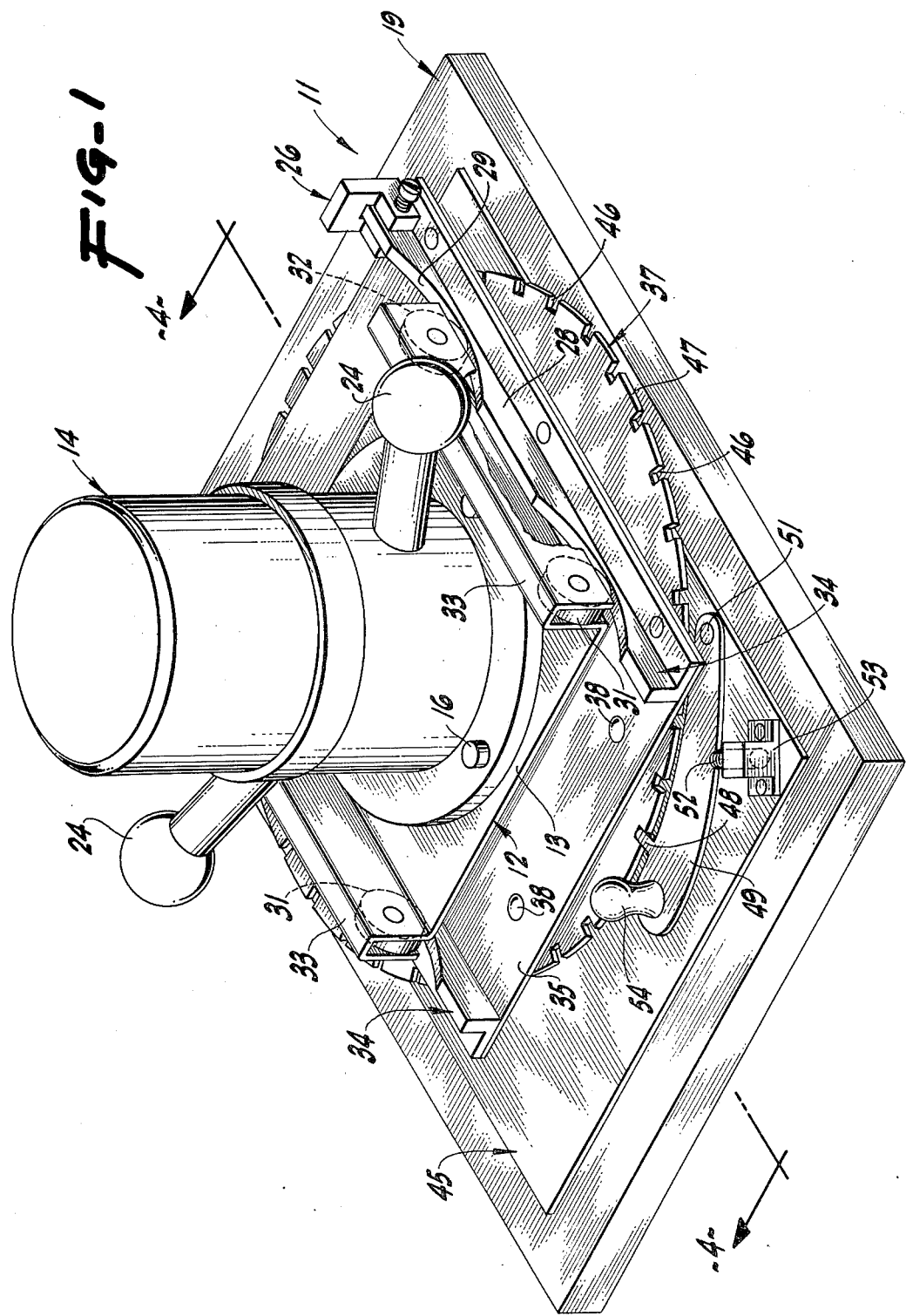
FIG. 1 is a perspective view showing a router combined with the attachment of the invention located above a workpiece being decorated, portions of the carriage channels being broken away to disclose interior details.

The router attachment of the invention, generally designated by the reference numeral 11, includes a carriage 12 having a flat bed 13 on which a conventional router 14 is removably mounted by any suitable means, such as fasteners 16. The router bit 17 extends through a central hole 18 in the flat bed 13 in order to reach a subjacent workpiece 19.

Figure 4:
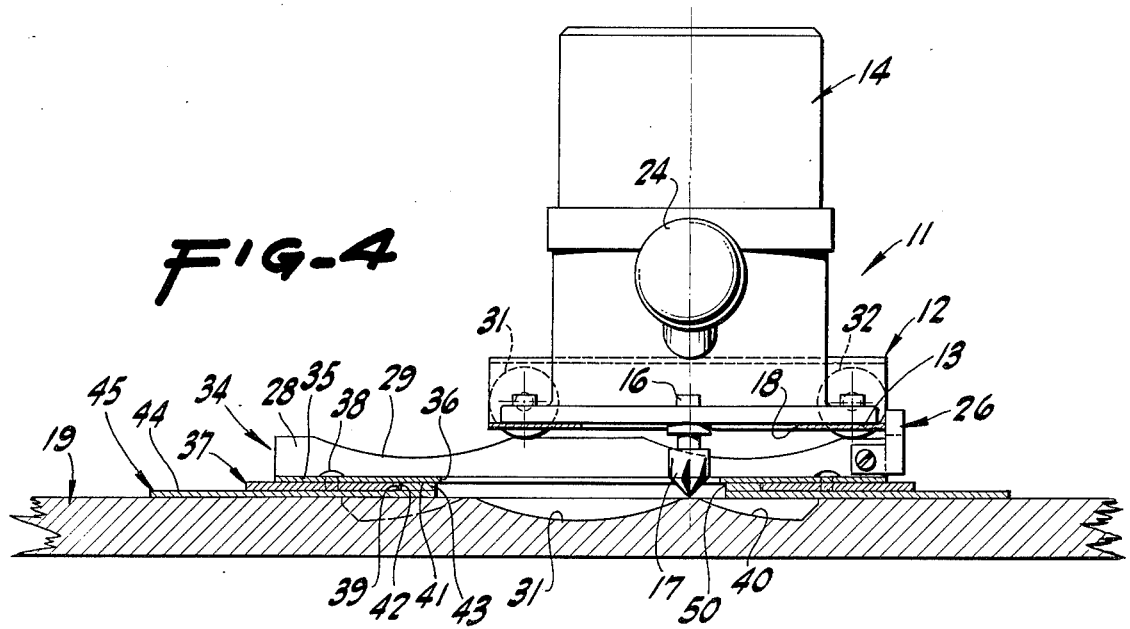

The flat bed 13 is supported by two pairs of concentric wheels 31 and 32 placed on a pair of parallel rails 28, the tops of which are contoured to form a predetermined profile 29, as in FIGS. 1 and 4. As the wheels move along the profile 29 by gripping the router handles 24 and moving the router 14 to or fro, the router rises and falls in dependence upon the slope of the modulations. The extent of the differences in elevation determines the depth of the cut 31 formed by the router bit 17.

The operator can also change the configuration by moving the router over only a portion of the track length formed by the rails 28. Conveniently, readily movable stops 26 can be located on the rails to limit the extent of movement of the router bit 17 in order to obtain reproducible ornamentation having desired contours.

Figure 2:
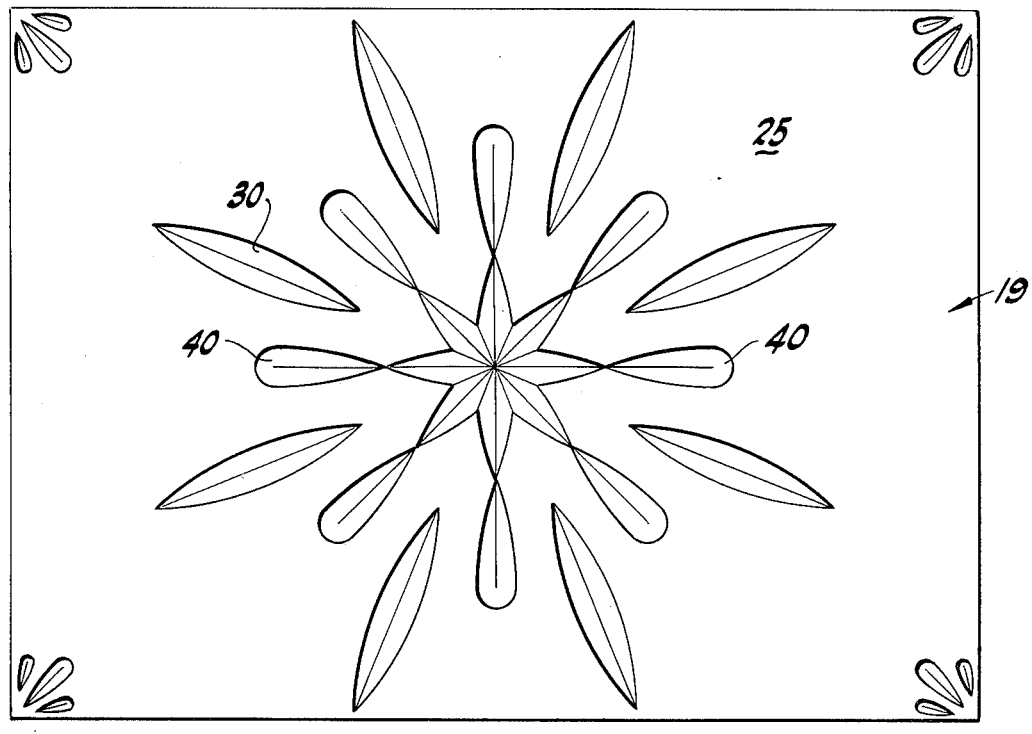
FIG. 2 is a top plan view of a workpiece in which various decorative patterns are shown, the central pattern having been formed by using the full length of the particular rail contour illustrated in FIG. 1 and the remaining patterns by relocating the base plate and using only a portion of the rail length.
Figure 3:
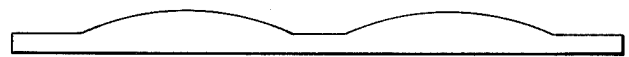
FIG. 3 is an elevational view of a track with another contour on the rail top; and, FIG. 4 is a median vertical sectional view of the attachment with the router, showing the path of the router bit poised above a workpiece with still another contour on the rail top, the plane of the section being indicated by the line 4—4 in FIG. 1.

Thus, if the operator were to move the device forwardly so that the rollers completed one whole revolution, the cut formed by the router bit 17 would resemble, in plan, the cross section of a double-convex optical lens as indicated by the reference numeral 30 in FIG. 2.

If, on the other hand, the router were to be advanced for only a half revolution of the rollers and then halted by a stop 26, the resulting cut would resemble, in plan, the longitudinal cross section of a teardrop, (as indicated by the numeral 40 in FIG. 2).

It should also be noted, at this juncture, that the shape of the cut can be varied by utilizing router bits having different profiles including V-shaped and U-shaped bits of various sizes and slopes of cutting edges.

As can be seen, the two pairs of wheels 31 and 32 are rotatably mounted within a pair of parallel fore and aft channels 33 upstanding from the lateral sides of the flat bed 13 of the carriage 12. It should also be noted that by flanging the wheels, as in a railroad car wheel, the channel can be eliminated.

The wheels 31 and 32 are supported by and are in rolling engagement with the contoured tops 29 of a pair of parallel rails 28, the rails 28 being mounted on a rail plate 35 having a central opening 36. The two rails 28 plus the rail plate 35 are conveniently designated as a track 34.

As the carriage 12 and the router 14 mounted thereon advance along the rails 28 the router 14 and the router bit 17 rise and fall in dependence upon the profile of the contoured rail tops 29.

The profiled rails 28 provide one degree of freedom of motion in a vertical direction and one degree of freedom of motion in a horizontal, fore and aft direction.

In order to enhance the versatility of the device, a third degree of freedom of motion is afforded by the provision of a turntable 37 on which the rails 28 and rail plate 35 are removably mounted, as by fasteners 38.

The turntable 37 is preferably circular in plan and has a central aperture 39 of relatively large diameter. The fasteners 38 are so located that when the rail plate 35 is mounted on the turntable 37 the central opening 36 in the rail plate 35 is coaxial with respect to the aperture 39 in the turntable 37. However, the rail plate opening 36 is smaller in diameter than the turntable aperture 39, and as a consequence an annular shoulder 41 is formed on the bottom surface of the rail plate 35 and an annular recess 42 is formed by the walls of the aperture 39 in the turntable 37.

Fitting into the annular recess 42 is an annular boss 43 upstanding from the top surface 44 of a base plate 45 having a central opening 50.

The annular boss 43 projecting upwardly from the base plate 45 is slightly less in outside diameter than the annular recess 42 in the turntable 37. Thus, the turntable 37 can be rotated relative to the base plate 45 and orient the router 14 in any desired direction.

Equal angular increments are provided by forming a plurality of notches 46 around the periphery 47 of the turntable 37, for example, every ten degrees of arc.

In order to position and hold the turntable 37 at any given angle, a detent finger 48 mounted on a lever 49 is adapted to lodge in any of the notches 46, the lever 49 being pivotally mounted on the base plate by a pivot pin 51 for swinging movement toward and away from the adjacent perimeter 47 of the turntable. A compression spring 52 based in a housing 53 abuts the lever 49 and urges the detent finger 48 toward the turntable and into engagement with a notch 46 indexed with the detent finger 48. A knob 54 upstanding from the lever 49 enables the operator to disengage the detent by swinging the lever away from the turntable. After the detent is disengaged, the turntable can be manually rotated to the next angular position and the knob released to permit the detent 48 to re-engage an indexed notch 46.

The three degrees of freedom afforded by the device, together with an artistic selection of router bit sizes and shape, as well as the technique of stopping the travel of the bit so that the bit advances less than a full cycle of descent and ascent, enables an operator to create a myriad of patterns comprised of numerous different individual cuts or recesses in the workpiece.

Reproducibility is readily afforded owing to the turntable indexing feature and the distinctive different profiles 29 of the rails 28.

Ordinarily, the profile 29 on both of the rails is identical although in order to achieve certain effects, the two rails can be asymmetrical.

The various configurations shown in FIG. 2 represent only a very small number of the innumerable attractive and often intricate patterns readily formed in the workpiece 19. The workpiece is customarily of wood of any desired size, shape or composition, and can be either homogeneous in nature or laminated to provide special effects as the cuts penetrate successive layers.

I claim:

1. A router attachment for ornamenting a planar workpiece comprising:
   a. a base plate supported in face to face engagement by the workpiece, said base plate having a circular opening to provide access to the subjacent workpiece to be ornamented;
   b. an annular boss mounted on top of said base plate concentrically around the periphery of said circular opening;
   c. an annular turntable having a central circular aperture with a diameter slightly greater than the outer diameter of said boss to enable said turntable to circumscribe said boss and rotate relative thereto with accurate concentricity, the outer perimeter of said turntable being notched at equal angular increments;
   d. a track including a rail plate with a central circular perforation approximately the size of said circular opening in said base plate, and a pair of parallel rails mounted on said rail plate and straddling said perforation, the tops of said rails being formed with contours;
   e. means for securing said track on said turntable so that said perforation is concentric with respect to said aperture;
   f. a carriage including a flat bed and upstanding side walls having wheels mounted thereof for rolling engagement with the contoured tops of said rails, said carriage rising or falling in accordance with the contour shapes and sizes;
   g. means for mounting a router on said carriage with the router bit extending toward the workpiece area exposed through said perforation and said opening, the contours of said tops of said rails having a range of elevations sufficient to lower the router bit into cutting engagement with the workpiece for at least a portion of the length of said rails; and,
   h. detent means for selectively engaging at least one of said notches at a time to position said turntable, said track, said carriage and the router at a predetermined azimuth relative to the workpiece, said detent means including a lever pivotally mounted on said base plate, a tooth mounted on said lever adjacent said turntable for engagement with one of said notches at a time, and a spring biasing said lever and said tooth toward said outer perimeter of said turntable and into engagement with a registering one of said notches.

2. An attachment as in claim 1 further including stop means for limiting to a predetermined location the extend of movement of said carriage on said contoured tops of said rails.

* * * * *